United States Patent
Chang et al.

(10) Patent No.: US 6,931,404 B2
(45) Date of Patent: Aug. 16, 2005

(54) SYSTEM AND METHOD FOR OPERATING WORKFLOW

(75) Inventors: Sheng-Chang Chang, Taipei (TW); Hi Feng Wu, Taipei (TW)

(73) Assignee: Inventec Corporation (TW)

( * ) Notice: Subject to any disclaimer, the term of this patent is extended or adjusted under 35 U.S.C. 154(b) by 772 days.

(21) Appl. No.: 09/993,786

(22) Filed: Nov. 14, 2001

(65) Prior Publication Data

US 2003/0093475 A1 May 15, 2003

(51) Int. Cl.[7] .............................................. G06F 17/30
(52) U.S. Cl. ...................... 707/10; 707/2; 707/103 R; 707/104.1; 709/204; 709/219; 715/505; 715/513
(58) Field of Search ...................... 707/2, 9, 10, 103 R, 707/104.1; 715/500, 501.1, 505, 506, 513, 530; 705/7, 9, 35; 709/203, 204, 217, 218, 219, 221; 711/100, 121, 129, 154

(56) References Cited

U.S. PATENT DOCUMENTS

| | | | | |
|---|---|---|---|---|
| 5,077,666 A | * | 12/1991 | Brimm et al. | 705/2 |
| 5,581,691 A | * | 12/1996 | Hsu et al. | 714/15 |
| 5,907,837 A | * | 5/1999 | Ferrel et al. | 707/3 |
| 5,999,911 A | * | 12/1999 | Berg et al. | 705/9 |
| 5,999,939 A | * | 12/1999 | de Hilster et al. | 707/102 |
| 6,208,986 B1 | * | 3/2001 | Schneck et al. | 707/3 |
| 6,336,124 B1 | * | 1/2002 | Alam et al. | 715/523 |
| 6,718,340 B1 | * | 4/2004 | Hartman et al. | 707/104.1 |
| 2001/0032106 A1 | * | 10/2001 | Smith et al. | 705/7 |
| 2002/0133503 A1 | * | 9/2002 | Amar et al. | 707/104.1 |
| 2004/0205455 A1 | * | 10/2004 | Dathathraya | 715/500 |

OTHER PUBLICATIONS

Manister, Larry et al., "Form–based File Upload in HTML", Network Working Group, RFC: 1867, Xerox Corporation, Nov. 1995, pp. 1–13.*

Warnick, Walter I. et al., "Searching the Deep Web", D–Lib Magazine, Jan. 2001, vol. 7, No. 1, ISSN 1082–9873.*

* cited by examiner

*Primary Examiner*—Shahid Al Alam
(74) *Attorney, Agent, or Firm*—Peter F. Corless; Steven M. Jensen; Edwards & Angell, LLP

(57) ABSTRACT

A system for operating a workflow and a method applied to the system are proposed, so as to conduct an electronic workflow for an enterprise based on a server/client architecture in a intranet or internet environment. A terminal device of the system allows a user at the terminal device to submit a request for inquiring, browsing, issuing or reading a document, which is transmitted a network server for initiating a service server, so as to process the request and transmit the processed result through the network server to the user. The foregoing system and method can substitute for a conventional system in manual processing and is a powerful tool to fulfill the objectives for an enterprise in promoting the working efficiency and reducing the management cost.

5 Claims, 7 Drawing Sheets

SYSTEM AND METHOD FOR OPERATING WORKFLOW

FIELD OF THE INVENTION

The present invention relates to systems and methods for operating workflows, and more particularly, to a system and a method for operating a workflow, which can be applied to an electronic workflow for an enterprise based on a server/client architecture over the intranet or internet.

BACKGROUND OF THE INVENTION

In a conventional workflow, an application form/document is submitted in a written form by an applicant, and needs to be manually processed for approval. However, in the manual process, it usually happens that the form/document is processed time-ineffectively due to working inefficiency of a person in charge of the form/document. Even worse, the form/document may be possibly lost in the manual process, and thus the applicant has to submit a new application form/document again. Therefore, the conventional workflow is disadvantageous in time-consuming, resource-wasting such as paper and increasing process complexity.

In an efficiency-oriented enterprise, it definitely requires a method for conveniently and efficiently processing a document, so as to allow employees and workgroups to rapidly access information and easily communicate and collaborate with each other, and also allow a workflow to be effectively simplified. In this case, the optimal method is to employ a groupware system and database for introducing an electronic workflow in application to the enterprise so as to allow the workflow to be improved.

Therefore, it is desired to develop a system and a method for operating a workflow, which can be applied to an electronic workflow for an enterprise based on a server/client architecture for digitizing information and automating the workflow, in an effort to improve the processing efficiency for a document and significantly reduce the overall cost for the enterprise.

SUMMARY OF THE INVENTION

A primary objective of the present invention is to provide a system and a method for operating a workflow, which can be applied to an electronic workflow for an enterprise based on a server/client architecture over the intranet or internet.

In accordance with the above and other objectives, a system for operating a workflow is proposed in the present invention, comprising a terminal device, a network server and at least one service server. The terminal device for allowing a user at the terminal device to submit a request for inquiring, browsing, issuing or reading a document in the use of a browser of the terminal device together with an element of component type provided by the network server, and for transmitting the inquiry, browsing or issuing request to the network server. The network server for transmitting the request to a document processing center thereof after receiving the request from the terminal device, wherein the document processing center generates a response corresponding in category to the request and then initiate an associated service server. The service server for processing the request in cooperation with a service database thereof so as to obtain a processed result of the request, which is transmitted through the network server to the user at the terminal device.

A method for operating a workflow applied to the system for operating a workflow is proposed in the invention, comprising the following steps.

(1) submitting a request for inquiring, browsing, issuing or reading a document via a user at the terminal device in the use of a browser together with an element of component type provided by the network server, wherein if the inquiry request is conducted, then step (2) is followed; if the browsing request is performed, then step (8) is followed; if the reading request is employed, then step (14) is followed; and if the issuing request is proceeded, then step (16) is followed;

(2) inputting keywords to an inquiry form via the user at the terminal device in the use of the browser together with the element of component type provided by the network server so as to conduct the inquiry request;

(3) transmitting the inquiry request via the browser to the network server over the network;

(4) transmitting the inquiry request via the network server to a document processing center of the network server after receiving the inquiry request, and generating a response corresponding in category to the inquiry request and initiating an associated service server via the document processing center;

(5) searching in a service database of the service server for the document to be inquired via a document inquiring program of the document processing center, and transmitting a searched result of the inquired document to the document processing center;

(6) transmitting a form containing the searched result of the inquired document via the document processing center to the terminal device over the network;

(7) displaying a form containing the searched result of the inquired document via the browser of the terminal device;

(8) inputting keywords to a browsing form via the user at the terminal device in the use of the browser together with the element of component type provided by the network server so as to conduct the browsing request;

(9) transmitting the browsing request via the browser to the network server over the network;

(10) transmitting the browsing request via the network server to the document processing center of the network server after receiving the browsing request, and generating a response corresponding in category to the browsing request and initiating an associated service server via the document processing center;

(11) searching in a service database of the service server for the document to be browsed via a document browsing program of the document processing center, and transmitting a searched result of the browsed document to the document processing center;

(12) transmitting a form containing the searched result of the browsed document via the document processing center to the terminal device over the network;

(13) displaying a form containing the searched result of the browsed document via the browser of the terminal device;

(14) inputting keywords to a reading form via the user at the terminal device in the use of the browser together with the element of component type provided by the network server so as to conduct the reading request;

(15) searching in a document database of the terminal device for the document to be read in response to the input keywords, wherein if the read document is available from the document database, a form containing a searched result of the read document is displayed via the browser, or otherwise, step (8) is followed for document browsing;

(16) filling in an issuing form selected by the user at the terminal device with document data necessary for performing the issuing request in the use of the browser together with the element of component type provided by the network server;

(17) defining via the user a routing and a deadline at each checkpoint of the routing for examining the issuing form;

(18) providing an examiner/parallel examiner and an agent for the examiner in the routing for examining the issuing form;

(19) transmitting the issuing form of the browser to the network server over the network;

(20) processing the issuing form via the document processing center of the network server in cooperation with the service server corresponding to the routing and examiner/parallel examiner for examining the issuing form;

(21) transmitting a form containing an examined result of the issuing form via the document processing center of the network server to the terminal device over the network; and

(22) displaying a form containing the examined result of the issuing form via the browser of the terminal device, and storing the form containing the examined result of the issuing form in the browser of the terminal device if necessary.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

Figure 1:
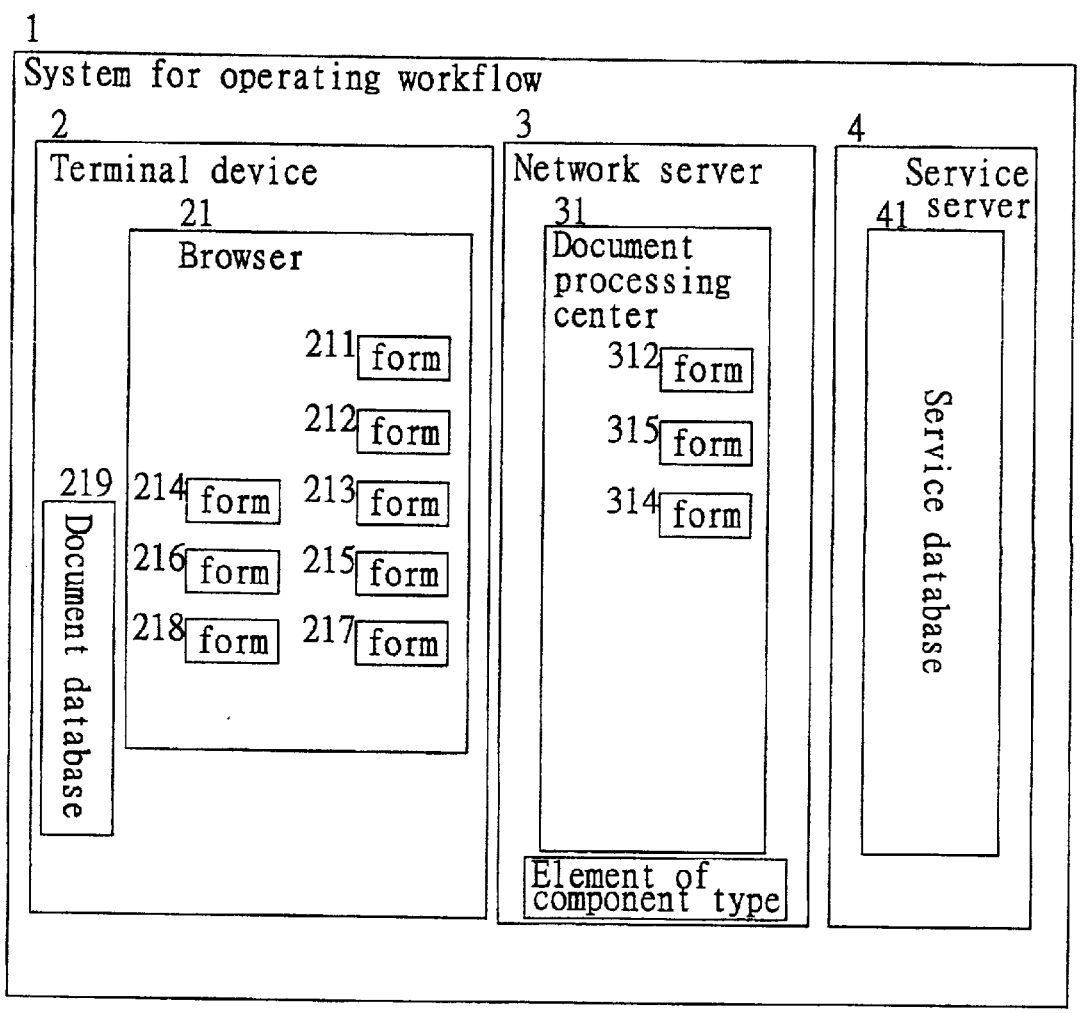
FIG. 1 is a block diagram showing a basic architecture of the system for operating a workflow of the invention.

Illustrated in FIG. 1 is a basic architecture of the system for operating a workflow of the invention. As shown, the system for operating a workflow 1 includes a terminal device 2, a network server 3 and at least one service server 4. A user at the terminal device 2 uses a browser 21 in cooperation with an element of component type 22 provided by the network server 3, for submitting a respective request for inquiring, browsing, issuing and reading a document.

This can be implemented in a manner that keywords of the document are input respectively to an inquiry form 211, a browsing form 213, an issue form 215 and a reading form 217 of the browser 21, so as to conduct the inquiry request, the browsing request, the issuing request and the reading request. Except the reading request, other three requests are then transmitted as the forms to the network server 3 through the intranet or internet. Upon receipt of the three requests, the network server 3 forwards them to a document processing center 31 thereof, which then generates a response corresponding in type to the respective request so as to initiate an associated service server 4. The service server 4 in association with a service database 41 processes the respective request and generates a corresponding response, which is transmitted through the network server 3 to the user at the browser 21 of the terminal device 2.

Upon receiving the inquiry request, the document processing center 31 processes and presents the inquired document in a form 312, which is transmitted to the terminal device 2 via the intranet or internet, and then displayed as a form 212 in the browser 21 of the terminal device 2. Similarly, if the document processing center 31 receives the browsing request, the browsed document presented in a form 314 is transmitted to the terminal device 2 via the intranet or internet, and displayed as a form 214 in the browser 21 of the terminal device 2. Moreover, in the case of the issuing request being received by the document processing center 31, the request is processed for presenting and transmitting the issued document as a form 315 to the terminal device 2 via the intranet or internet, while the issued document is then displayed as a form 216 and stored in the browser 21 of the terminal device 2. In addition, for conducting the reading request, the browser 21 searches a database 219 for the read document and present the read document in a form 218 for display.

The service server 4 can be an exchange server, a SMTP server, or a database server such as MS SQL server or ORACLE server.

In an electronic workflow process, the system for operating a workflow 1 including the terminal device 2, the network server 3 and the service server 4 provides the following functions:

1. serial routing;
2. parallel routing;
3. conditional routing;
4. any combination of the serial, parallel and conditional routings;
5. controlling and supporting an electronic routing having unlimited checkpoints;
6. supporting an examination routing of a predefined routing at a server for a virtual group with a flexible structure, i.e. the system automatically identifying an applicant's identity for activating the routing, so that the applicant needs not to remember the routing and efficiency in time can be significantly improved;
7. supporting an agent function for time-effectively processing a document in case of unavailability for a person in charge of the document so as to eliminate delay in the document processing, wherein the delay problem can be solved as follows:
   a. bypassing the document to another person;
   b. bypassing the document to an agent;
   c. constructing forcedly a routing for processing the document if necessary in response to practical requirements; and d. allowing a system administrator to manually modify the routing for processing the document if necessary;

8. setting an examination deadline at each checkpoint in an examination routing for the document so as to improve the overall traveling efficiency for the document and allow the applicant to access the status of the document in real time, as well as enable the system administrator to control all conditions in the routing for the document via a system monitoring program;

9. enabling every checkpoint of a routing to determine whether a c.c. function (i.e. provision of carbon copies) is activated so as to prevent important documents from leaking out;

10. employing an open architecture in the use of an e-form flow template of a browser together with the exchange server or MS SQL server so as to integrate the overall information for access and to provide optimal solutions; and 11. enabling the system to self-expand programs so as to integrate a workflow with other information systems.

The above functions of the system for operating a workflow 1 in the electronic workflow process will be fully described with reference to the following drawings.

Figure 2:
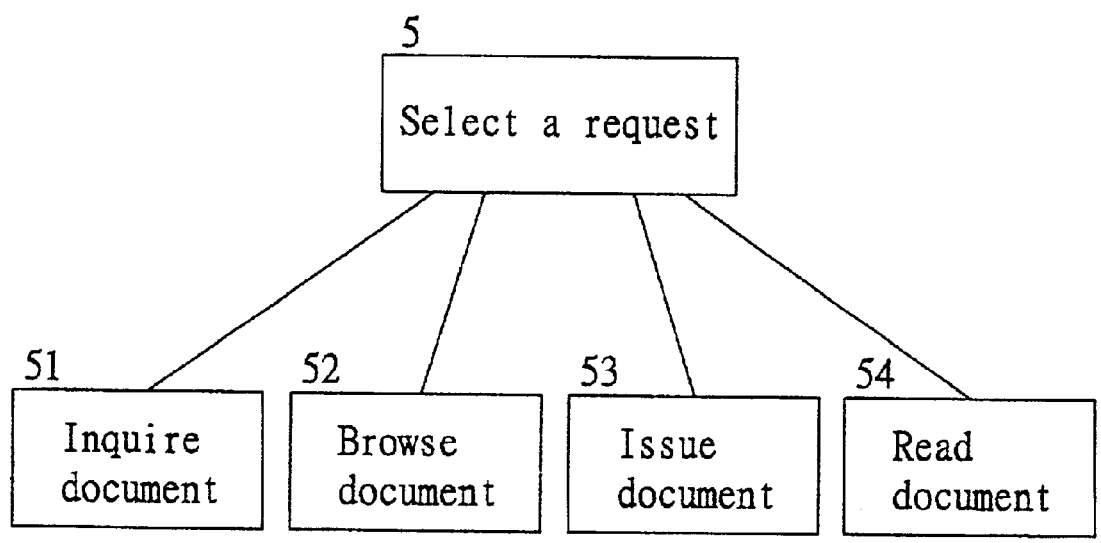
FIG. 2 is a schematic diagram showing the steps involved in performing the method for operating a workflow in the use of the system for operating a workflow of the invention.

FIG. 2 illustrates the steps involved in performing the method for operating a workflow in the use of the system for operating a workflow of the invention. In the use of a browser 21 together with an element of component type 22 provided by a network server 3, a user at a terminal device 2 can submit a respective request for inquiring, browsing, issuing and reading a document. For conducting the inquiry request, the request is transmitted via the intranet or internet to the network server 3, and step 51 for inquiring a document is followed. Similarly, the browsing request is conducted as to be transmitted to the network server 3 with step 52 for browsing a document subsequently accompanied. In the case of the issuing request to be conducted, transmission of the request to the network server 3 is performed and followed by step 53 for issuing a document. As for conducting the reading request, step 54 for reading a document is proceeded.

Figure 3:
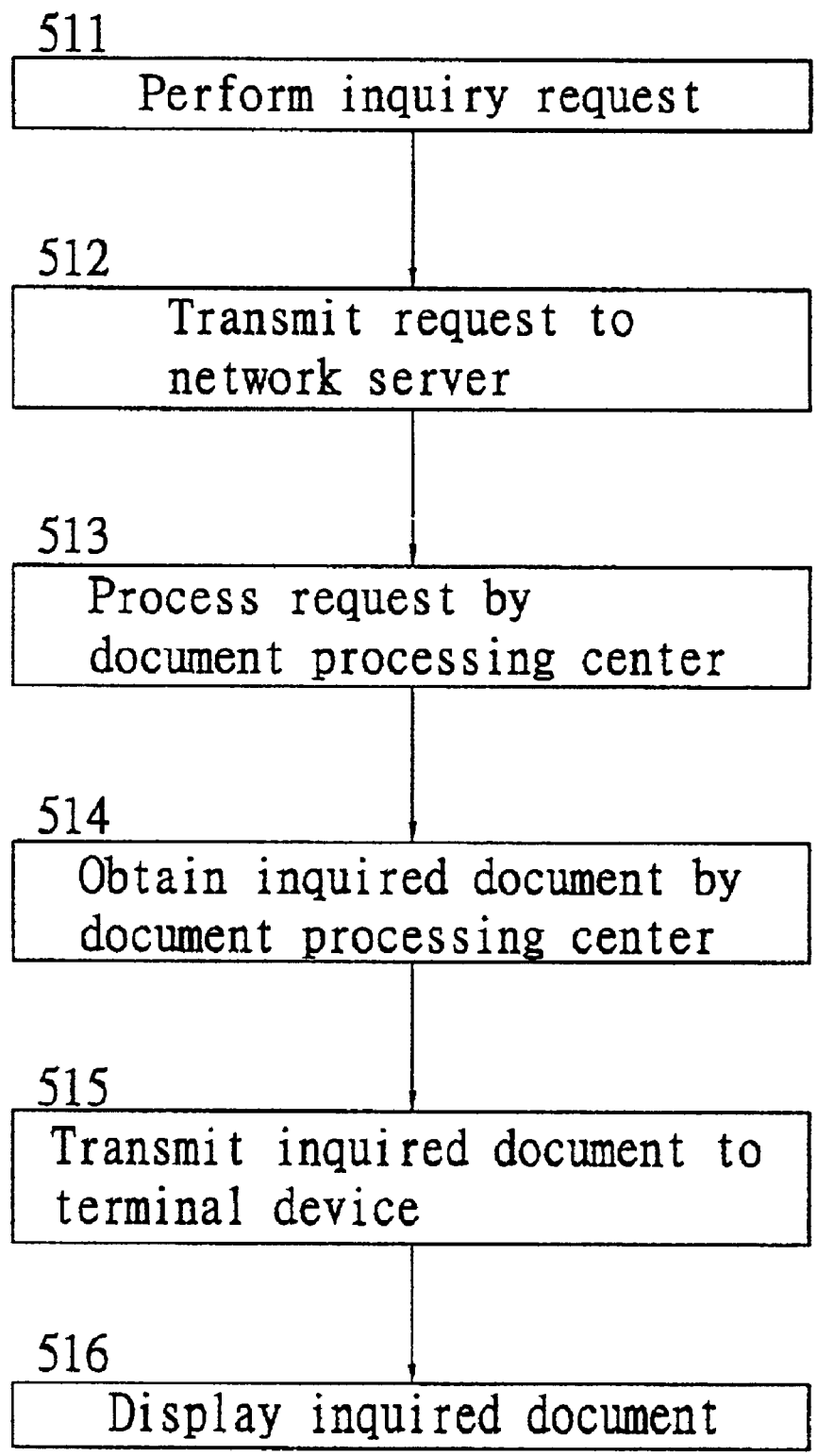
FIG. 3 is a schematic diagram showing the detail steps involved in inquiring a document in FIG. 2.

FIG. 3 illustrates the detail steps involved in inquiring a document in FIG. 2. As shown in the drawing, first in step 511, the user at the terminal device 2 uses the browser 21 together with the element of component type 22 provided by network server 3 for inputting keywords to an inquiry form 211 of the browser 21 so as to conduct a request for inquiring a document relating to the keywords. Thereafter, step 512 is followed.

In step 512, the browser 21 transmits the inquiry request to the network server 3 via the intranet or internet. Thereafter, step 513 is followed.

In step 513, the network server 3 transmits the inquiry request to a document processing center 31 thereof, which then generates a response corresponding in type to the inquiry request and initiates an associated service server 4. Thereafter, step 514 is followed.

In step 514, after the associated service server 4 is initiated, a document inquiring program 311 of the document processing center 31 is employed for searching in a service database 41 of the service server 4 and transmits the searched result of the inquired document to the document processing center 31. Thereafter, step 515 is followed.

In step 515, upon receiving the searched result of the inquired document, the document processing center 31 transmits the inquired document contained in a form 312 to the terminal device 2 via the intranet or internet. Thereafter, step 516 is followed.

In step 516, the browser 21 of the terminal device 2 displays a form 212 containing the inquired document in response to the request of the user.

In the above process for document inquiry, an open architecture is employed for allowing the e-form flow template of the browser 21 together with the service server 4, such as the exchange server or MS SQL server, to integrate the overall information for inquiry.

Figure 4:
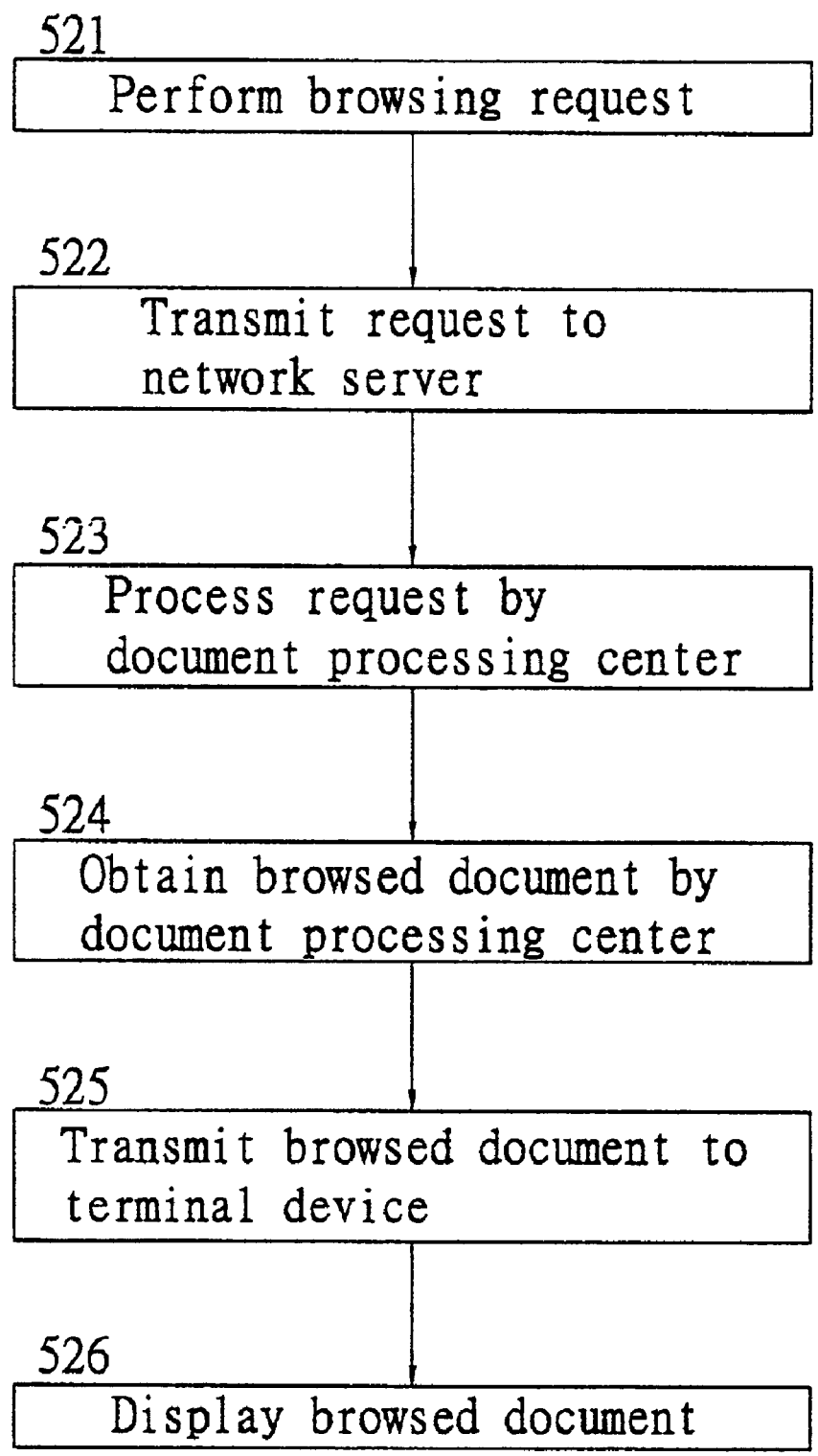
FIG. 4 is a schematic diagram showing the detail steps involved in browsing a document in FIG. 2.

FIG. 4 illustrates the detail steps involved in browsing a document in FIG. 2. As shown, first in step 521, the user at the terminal device 2 use the browser 21, such as MS Outlook software, in cooperation with the element of component type 22 provided by the network server 3, to input keywords to a browsing form 213, so as to conduct a request for browsing a document relating to the keywords. Thereafter, step 522 is followed.

In step 522, the browser 21 transmits the browsing request to the network server 3 via the intranet or internet. Thereafter, step 523 is followed.

In step 523, the network server 3 transmits the browsing request to a document processing center 31 thereof, which then generates a response corresponding in type to the browsing request and initiates an associated service server 4. Thereafter, step 524 is followed.

In step 524, after the associated service server 4 is initiated, a document browsing program 311 of the document processing center 31 is employed for searching in a service database 41 of the service server 4 and transmits the searched result of the browsed document to the document processing center 31. Thereafter, step 525 is followed.

In step 525, upon receiving the searched result of the browsed document, the document processing center 31 transmits the browsed document contained in a form 314 to the terminal device 2 via the intranet or internet. Thereafter, step 526 is followed.

In step 526, the browser 21 of the terminal device 2 displays a form 214 containing the browsed document in response to the request of the user.

In the above process for document browsing, an open architecture is employed for allowing the e-form flow template of the browser 21 together with the service server 4, such as the exchange server or MS SQL server, to integrate the overall information of completed documents for browsing.

Figure 5:
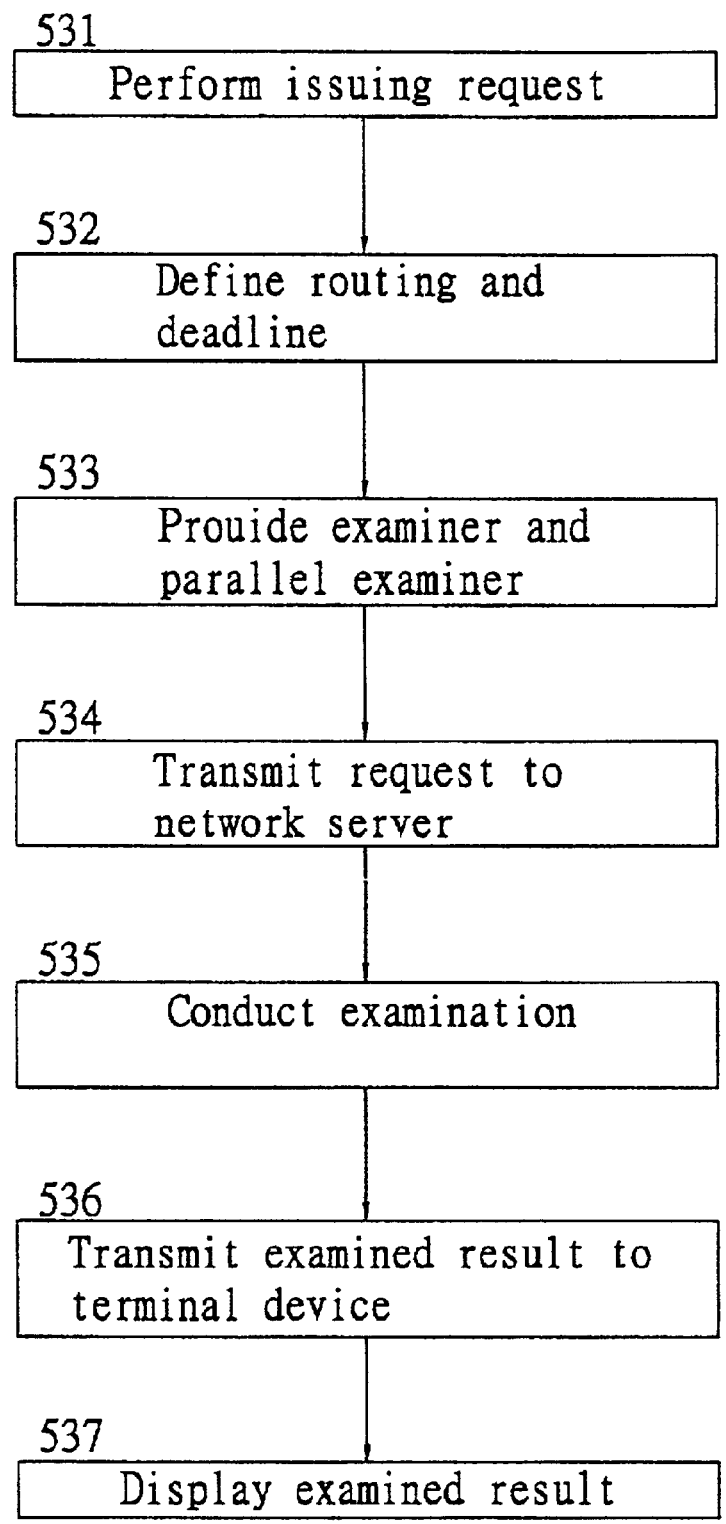
FIG. 5 is a schematic diagram showing the detail steps involved in issuing a document in FIG. 2.

FIG. 5 illustrates the detail steps involved in issuing a document in FIG. 21. As shown, first in step 531, the user of the terminal device 2 uses the browser 21 together with the element of component type 22 provided by the network server 3 to perform a request for issuing a document through an issuing form 215. The issuing form 215 can be an ISO document inspection form, a job application sheet, an interior training application form, an exterior training application form, an employee attendance form and the like; while a suitable issuing form 215 is selected by the user to be filled in with document data necessary for conducting the issuing request. Thereafter, step 532 is followed.

In step 532, the user defines a routing and a deadline at each checkpoint of the routing for examining the issuing form 215. If necessary, the routing of the issuing form 215 can be constructed to provide functions of serial routing; parallel routing; conditional routing; any combination of the serial, parallel and conditional routings; controlling and supporting an electronic routing having unlimited checkpoints; supporting an examination routing of a predefined routing at a server for a virtual group with a flexible structure, i.e. the system automatically identifying the user's identity for activating the routing, so that the user needs not to remember the routing and efficiency in time can be significantly improved; setting an examination deadline at each checkpoint in an examination routing for a document so as to improve the overall traveling efficiency for the document and allow the user to access the status of the document in real time, as well as enable a system administrator to control all conditions in the routing for the document via a system monitoring program, in an effort to make the routing and deadline for examining the document more flexible and functional; and enabling every checkpoint of a routing to determine whether a c.c. function is activated so as to prevent important documents from leaking out. Thereafter, step 533 is followed.

In step 533, in the routing for examining the issuing form 215, an examiner/parallel examiner and an agent for the examiner is provided, for allowing an agent function to be supported for time-effectively processing the issuing form 215 in case of unavailability for a person in charge of the form processing, so as to eliminate delay in the routing. Moreover, a routing can be forcedly constructed for processing the form 215 if necessary in response to practical requirements, while the system administrator is allowed to manually modify the routing for processing the form 215 if necessary. Thereafter, step 534 is followed.

In step 534, the browser 21 transmits the issuing form 215 to the network server 3 via the intranet or internet. Thereafter, step 535 is followed.

In step 535, in an examination process, upon receiving the issuing form 215, a document processing center 31 of the network server 3 together with the service server 4 process the issuing form 215 corresponding to the routing and examiner/parallel examiner for examining the issuing form 215. Thereafter, step 536 is followed.

In step 536, the document processing center 31 of the network server 3 transmits the processed result of the issuing form 215 contained in a form 315 to the terminal device 2 via the intranet or internet. Thereafter, step 537 is followed.

In step 537, after the terminal device 2 receives the form 315, the browser 21 displays a form 216 containing the processed result of the issuing form, which can be stored in the browser 21 of the terminal device 2.

In the above process for document issuing, an open architecture is employed for allowing the e-form flow template of the browser 21 together with the service server 4, such as the exchange server or MS SQL server, to integrate the overall information for examination.

In the examination process, upon receiving the issuing form 215, the document processing center 31 of the network server 3 together with the service server 4 process the issuing form 215 corresponding to the routing and examiner/ parallel examiner for examining the issuing form 215. The document processing center 31 provides functions of serial routing, parallel routing, conditional routing, and any combination of the serial, parallel and conditional routings. Further, the document processing center 31 controls and supports an electronic routing having unlimited checkpoints, and supports an examination routing of a predefined routing at a server for a virtual group with a flexible structure, i.e. the system automatically identifying the user's identity for activating the routing, so that the user needs not to remember the routing and efficiency in time can be significantly improved. Moreover, the document processing center 31 supports an agent function for time-effectively processing a document in case of unavailability for a person in charge of the document so as to eliminate delay in the document processing; a routing can be forcedly constructed for processing the document if necessary in response to practical requirements, while the system administrator is allowed to manually modify the routing for processing the document if necessary. Furthermore, the document processing center 31 allows an examination deadline to be set at each checkpoint in an examination routing for the document so as to improve the overall traveling efficiency for the document and allow the user to access the status of the document in real time, as well as enable a system administrator to control all conditions in the routing for the document via a system monitoring program, in an effort to make the routing and deadline for examining the document more flexible and functional; while every checkpoint of a routing is allowed to determine whether a c.c. function is activated so as to prevent important documents from leaking out. In addition, the document processing center 31 allows the system to self-expand programs so as to integrate a workflow with other information systems. The examination process will be described in more detail with reference to FIG. 7.

Figure 6:
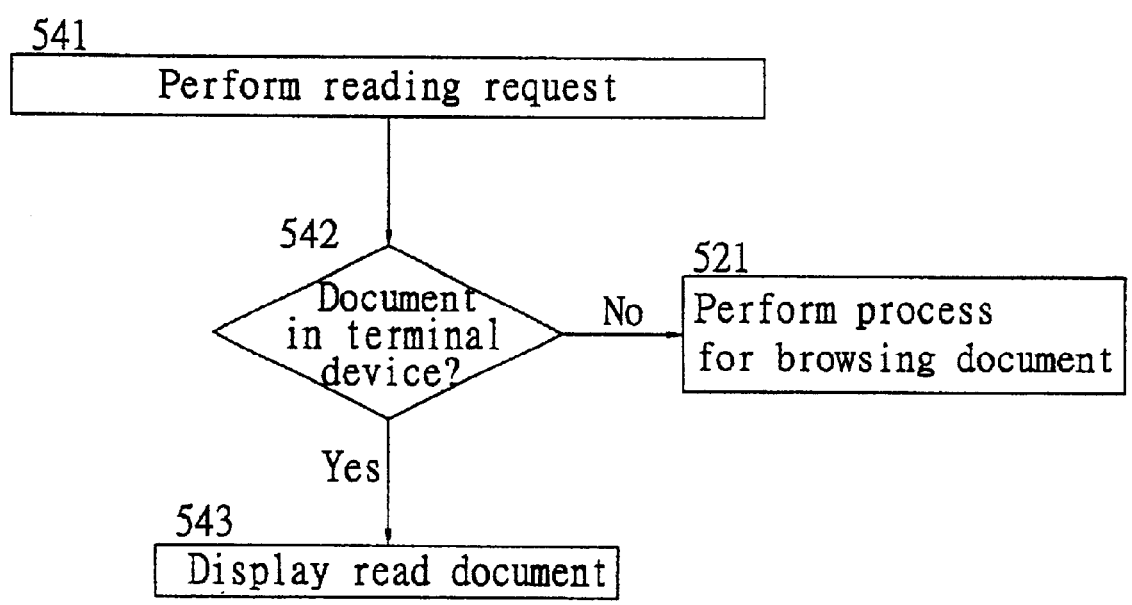
FIG. 6 is a schematic diagram showing the detail steps involved in reading a document in FIG. 2.

FIG. 6 illustrates the detail steps involved in reading a document in FIG. 2. First in step 541, the user of the terminal device 2 uses the browser 21 such as MS Outlook software, to input keywords to a reading form 217 for performing a request for reading a document, in cooperation with the element of component type 22 provided by the network server 3. Thereafter, step 542 is followed.

In step 542, the browser 21 of the terminal device 2 searches in a document database 219 for the document to be read according to the input keywords. If the read document is obtained, step 543 is followed, or else step 521 is followed so as to conduct a process for browsing a document.

In step 543, the browser 21 displays a form 218 containing the read document.

In the above process for document reading, the browser 21 with the e-form flow template is employed to help obtain the read document.

Figure 7:
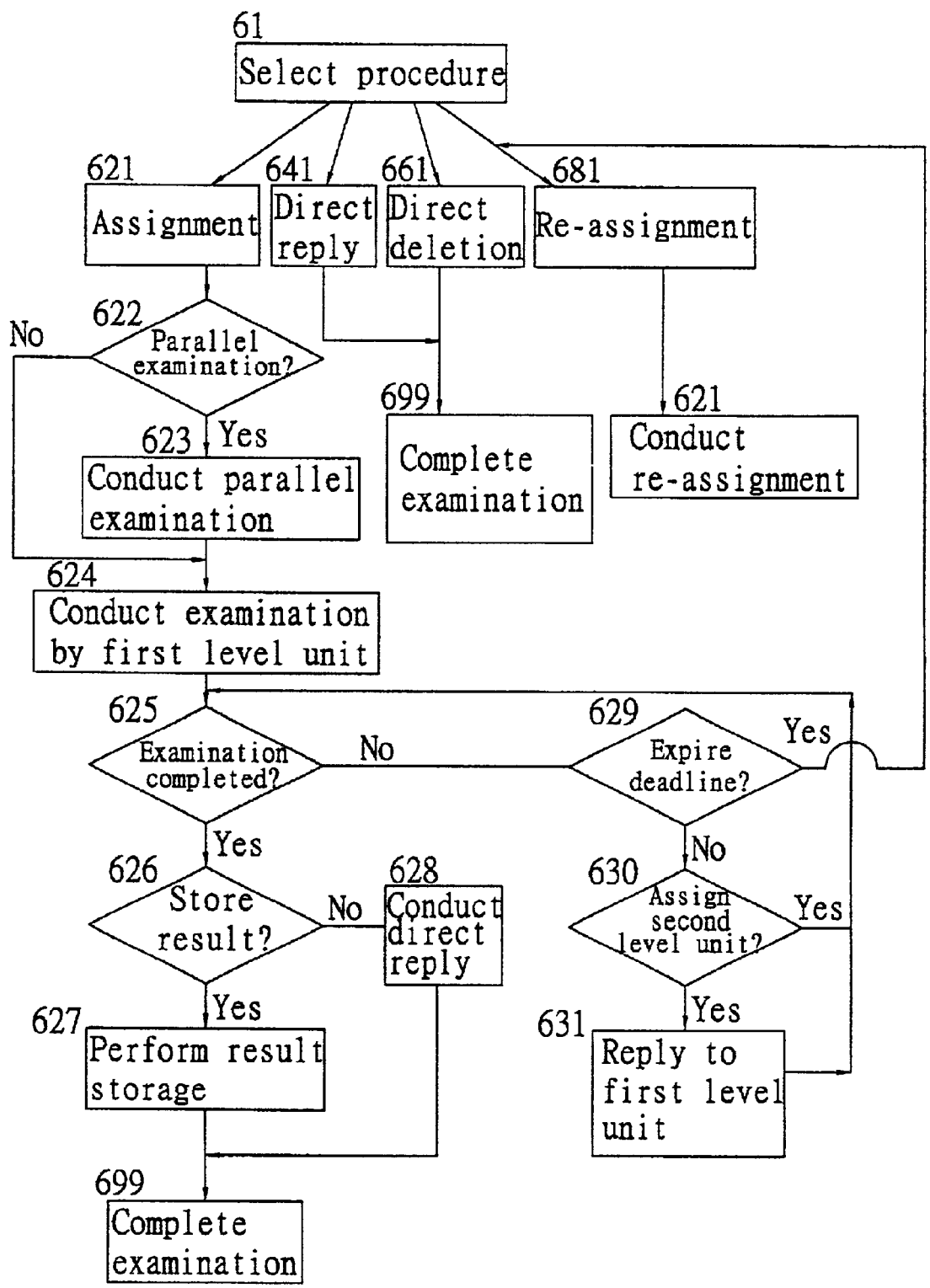
FIG. 7 is a schematic diagram showing the detail steps involved in conducting an examination in FIG. 5.

FIG. 7 illustrates the detail steps involved in conducting an examination in FIG. 5. After receiving the issuing form 215, the document processing center 31 of the network server 3 processes the issuing form 215 in cooperation with the service server 4 according to the routing and the examiner/parallel examiner for examining the issuing form 215. As shown in the drawing, first in step 61, upon receiving the issuing form 215, the document processing center 31 conducts a procedure of assignment, a direct reply, direct deletion or reassignment for the issuing form 215 according to the content and category of the issuing form 215. If the assignment procedure is performed, then step 621 is followed. If the direct-reply procedure is conducted, then step 641 is followed. If the direct-deletion procedure is employed, then step 661 is followed. If the re-assignment procedure is proceeded, then step 681 is followed In step 621, the document processing center 31 transmits the issuing form 215 to a first level unit of an enterprise. Thereafter, step 622 is followed.

In step 622, after receiving the issuing form 215, the first level unit decides if another first level unit is required to conduct parallel examination for the issuing form 215. If the parallel examination is necessary, then step 623 is followed, or else step 624 is followed.

In step 623, the parallel examination is performed for the issuing form 215. After completion of the parallel examination, step 624 is followed.

In step 624, the first level unit examines the issuing form 215. Thereafter, step 625 is followed.

In step 625, if the examination for the issuing form 215 is completed, then step 626 is followed for storing the examined result of the issuing form 215 or conducting a direct reply, or else step 629 is followed.

In step 626, if it is to store the examined result of the issuing form 215, then step 627 is followed, or else step 628 is followed so as to conduct the direct reply In step 627, the document processing center 31 transmits the examined result of the issuing form 215 to the network server 4, which then stores the examined form 215 in the service database 41. Thereafter, step 699 is followed.

In step 628, the document processing center 31 conducts the direct reply according to the examined result of the issuing form 215. Thereafter, step 699 is followed.

In step 629, the examined form 215 is determined if it expires the examination deadline; if the examined form 215 is not overdue, then step 630 is followed, or else step 681 is followed.

In step 630, it is to determine if a second level unit of the enterprise is required to conduct the examination in serial with the first level unit for the issuing form 215. If the second level unit is necessary, then step 631 is followed, or else step 625 is followed.

In step 631, the second level unit conducts the examination in serial with the first level for the issuing form 215 and then transmits the examined result to the first level unit. Thereafter, step 625 is followed.

In step 641, the direct-reply procedure is performed in a manner that the document processing center 31 conducts the direct reply according to the issuing form 215. Thereafter, step 699 is followed.

In step 661, the direct-deletion procedure is performed in a manner that the document processing center 31 directly deletes the issuing form 215. Thereafter, step 699 is followed.

In step 681, the reassignment procedure is performed in a manner that the document processing center 31 re-assigns the issuing form 215, which expires the examination deadline and is not completely examined. Thereafter, step 621 is followed.

In the step 699 for completing the examination, after receiving the examined result of the issuing form 215, the document processing center 31 of the network server 3 together with the service server 4 terminate the examination according to the routing and examiner/parallel examiner for examining the issuing form 215. Thereafter, step 536 is followed.

In conclusion, the system and method for operating a workflow of the invention have the following advantages. First, the system and method for operating a workflow can be applied to an electronic workflow for an enterprise based on a server/client architecture over the intranet or internet. Furthermore, the present system and method provide the functions of serial routing, parallel routing, conditional routing, any combination of the serial, parallel and conditional routings, controlling and supporting an electronic routing having unlimited checkpoints, and supporting an examination routing of a predefined routing at a server for a virtual group with a flexible structure, i.e. the system automatically identifying an applicant's identity for activating the routing, so that the applicant needs not to remember the routing and efficiency in time can be significantly improved.

Moreover, the system and method for operating a workflow of the invention further support an agent function for time-effectively processing a document in case of unavailability for a person in charge of the document so as to eliminate delay in the document processing, wherein the delay problem can be solved by, for example, bypassing the document to another person, bypassing the document to an agent, constructing forcedly a routing for processing the document if necessary in response to practical requirements, and allowing a system administrator to manually modify the routing for processing the document if necessary. Further, in the system and method of the invention, an examination deadline is allowed to be set at each checkpoint in an examination routing for the document so as to improve the overall traveling efficiency for the document and allow the applicant to access the status of the document in real time, as well as enable the system administrator to control all conditions in the routing for the document via a system monitoring program. In addition, every checkpoint of a routing is allowed to determine whether a c.c. function (i.e. provision of carbon copies) is activated so as to prevent important documents from leaking out; enabling the system to self-expand programs so as to integrate a workflow with other information systems.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for operating a workflow, applied to a system for operating a workflow having a terminal device, a network server and at least one service server, for conducting an electronic workflow for an enterprise based on a server/client architecture in a network environment; the method comprising the steps of:

(1) inputting keywords to an inquiry form via a user at the terminal device in the use of a browser together with an element of component type provided by the network server so as to conduct a request for inquiring a document;

(2) transmitting the inquiry request via the browser to the network server over the network;

(3) transmitting the inquiry request via the network server to a document processing center of the network server after receiving the inquiry request, and generating a response corresponding in category to the inquiry request and initiating an associated service server via the document processing center;

(4) searching in a service database of the service server for the document to be inquired via a document inquiring program of the document processing center, and transmitting a searched result of the inquired document to the document processing center;

(5) transmitting a form containing the searched result of the inquired document via the document processing center to the terminal device over the network; and (6) displaying a form containing the searched result of the inquired document via the browser of the terminal device.

2. A method for operating a workflow, applied to a system for operating a workflow having a terminal device, a network server and at least one service server, for conducting an electronic workflow for an enterprise based on a server/client architecture in a network environment; the method comprising the steps of:

(1) inputting keywords to a browsing form via a user at the terminal device in the use of a browser together with an element of component type provided by the network server so as to conduct a request for browsing a document;

(2) transmitting the browsing request via the browser to the network server over the network;

(3) transmitting the browsing request via the network server to a document processing center of the network server after receiving the browsing request, and generating a response corresponding in category to the browsing request and initiating an associated service server via the document processing center;

(4) searching in a service database of the service server for the document to be browsed via a document browsing program of the document processing center, and transmitting a searched result of the browsed document to the document processing center;

(5) transmitting a form containing the searched result of the browsed document via the document processing center to the terminal device over the network; and (6) displaying a form containing the searched result of the browsed document via the browser of the terminal device.

3. A method for operating a workflow, applied to a system for operating a workflow having a terminal device, a network server and at least one service server, for conducting an electronic workflow for an enterprise based on a server/client architecture in a network environment; the method comprising the steps of:

(1) submitting a request for inquiring, browsing, issuing or reading a document via a user at the terminal device in the use of a browser together with an element of component type provided by the network server, wherein if the inquiry request is conducted, then step (2) is followed; if the browsing request is performed, then step (8) is followed; if the reading request is employed, then step (14) is followed; and if the issuing request is proceeded, then step (16) is followed;

(2) inputting keywords to an inquiry form via the user at the terminal device in the use of the browser together with the element of component type provided by the network server so as to conduct the inquiry request;

(3) transmitting the inquiry request via the browser to the network server over the network;

(4) transmitting the inquiry request via the network server to a document processing center of the network server after receiving the inquiry request, and generating a response corresponding in category to the inquiry request and initiating an associated service server via the document processing center;

(5) searching in a service database of the service server for the document to be inquired via a document inquiring program of the document processing center, and transmitting a searched result of the inquired document to the document processing center;

(6) transmitting a form containing the searched result of the inquired document via the document processing center to the terminal device over the network;

(7) displaying a form containing the searched result of the inquired document via the browser of the terminal device;

(8) inputting keywords to a browsing form via the user at the terminal device in the use of the browser together with the element of component type provided by the network server so as to conduct the browsing request;

(9) transmitting the browsing request via the browser to the network server over the network;

(10) transmitting the browsing request via the network server to the document processing center of the network server after receiving the browsing request, and generating a response corresponding in category to the browsing request and initiating an associated service server via the document processing center;

(11) searching in a service database of the service server for the document to be browsed via a document browsing program of the document processing center, and transmitting a searched result of the browsed document to the document processing center;

(12) transmitting a form containing the searched result of the browsed document via the document processing center to the terminal device over the network;

(13) displaying a form containing the searched result of the browsed document via the browser of the terminal device;

(14) inputting keywords to a reading form via the user at the terminal device in the use of the browser together with the element of component type provided by the network server so as to conduct the reading request;

(15) searching in a document database of the terminal device for the document to be read in response to the input keywords, wherein if the read document is available from the document database, a form containing a searched result of the read document is displayed via the browser, or otherwise, step (8) is followed for document browsing;

(16) filling in an issuing form selected by the user at the terminal device with document data necessary for performing the issuing request in the use of the browser together with the element of component type provided by the network server;

(17) defining via the user a routing and a deadline at each checkpoint of the routing for examining the issuing form;

(18) providing an examiner/parallel examiner and an agent for the examiner in the routing for examining the issuing form;

(19) transmitting the issuing form of the browser to the network server over the network;

(20) processing the issuing form via the document processing center of the network server in cooperation with the service server corresponding to the routing and examiner/parallel examiner for examining the issuing form;

(21) transmitting a form containing an examined result of the issuing form via the document processing center of the network server to the terminal device over the network; and

(22) displaying a form containing the examined result of the issuing form via the browser of the terminal device, and storing the form containing the examined result of the issuing form in the browser of the terminal device if necessary.

4. The method of claim 3, wherein the step (20) further comprises the steps of:

(20-1) performing an assignment procedure for transmitting the issuing form to a first level unit of the enterprise according to content and a category of the issuing form after receiving the issuing form via the document processing center;

(20-2) determining via the first level unit if another first level unit is required for parallel examination for the issuing form, wherein if the parallel examination is necessary, then step (20-3) is followed, or else step (20-4) is followed;

(20-3) conducting the parallel examination for the issuing form, and then performing step (20-4) after the parallel examination being completed;

(20-4) conducting the examination for the issuing form via the first level unit;

(20-5) determining if the examination for the issuing form is completed, wherein if the examination is completed, then step (20-6) is followed, or else step (20-9) is followed;

(20-6) determining whether to store an examined result for the issuing form or to conduct a direct reply, wherein step (20-7) is followed if to store the examined result for the issuing form, and step (20-8) is followed if to conduct the direct reply;

(20-7) transmitting the examined result of the issuing form via the document processing center to the service server, which stores the examined result of the issuing form in a service database thereof, and then performing step (20-13);

(20-8) conducting the direct reply via the document processing center according to the examined result of the issuing form, and then performing step (20-13);

(20-9) determining if the issuing form expires the deadline for the examination, wherein if the issuing form is not overdue, then step (20-10) is followed, or else step (20-12) is followed;

(20-10) determining if the issuing form needs to be assigned to a second level unit for conducting the examination in serial with the first level unit, wherein of the second level unit is necessary, then step (20-11) is followed, or else step (20-5) is followed;

(20-11) conduct the examination of the issuing form via the second level unit and transmits an examined result of the issuing form to the first level unit, and then performing step (20-5);

(20-12) performing a re-assignment procedure via the document processing center for re-assigning the issuing form, which expires the examination deadline and is not completely examined, and then performing step (20-1); and (20-13) terminating the examination via the document processing center of the network server together with the service server, according to the examination routing and examiner/parallel examiner for the issuing form.

5. The method of claim 3, wherein the step (20) further comprises the steps of:

(20-1) conducting a procedure of assignment, a direct reply, direct deletion or reassignment for the issuing form according to content and a category of the issuing form via the document processing center of the network server after receiving the issuing form, wherein if the assignment procedure is performed, then step (20-2) is followed; if the direct-reply procedure is conducted, then step (20-13) is followed; if the direct-deletion procedure is employed, then step (20-14) is followed; and if the re-assignment procedure is proceeded, then step (20-15) is followed;

(20-2) performing an assignment procedure for transmitting the issuing form to a first level unit of the enterprise according to the content and category of the issuing form after receiving the issuing form via the document processing center;

(20-3) determining via the first level unit if another first level unit is required for parallel examination for the issuing form, wherein if the parallel examination is necessary, then step (20-4) is followed, or else step (20-5) is followed;

(20-4) conducting the parallel examination for the issuing form, and then performing step (20-5) after the parallel examination being completed;

(20-5) conducting the examination for the issuing form via the first level unit;

(20-6) determining if the examination for the issuing form is completed, wherein if the examination is completed, then step (20-7) is followed, or else step (20-10) is followed;

(20-7) determining whether to store an examined result for the issuing form or to conduct a direct reply, wherein step (20-8) is followed if to store the examined result for the issuing form, and step (20-9) is followed if to conduct the direct reply;

(20-8) transmitting the examined result of the issuing form via the document processing center to the service server, which stores the examined result of the issuing form in a service database thereof, and then performing step (20-16);

(20-9) conducting the direct reply via the document processing center according to the examined result of the issuing form, and then performing step (20-16);

(20-10) determining if the issuing form expires the deadline for the examination, wherein if the issuing form is not overdue, then step (20-11) is followed, or else step (20-15) is followed;

(20-11) determining if the issuing form needs to be assigned to a second level unit for conducting the examination in serial with the first level unit, wherein of the second level unit is necessary, then step (20-12) is followed, or else step (20-6) is followed;

(20-12) conduct the examination of the issuing form via the second level unit and transmits an examined result of the issuing form to the first level unit, and then performing step (20-6);

(20-13) performing the direct-reply procedure via the document processing center for conducting a direct reply according to the issuing form, and then performing step (20-16);

(20-14) performing the direct-deletion procedure via the document processing center for directly deleting the issuing form, and then performing step (20-16);

(20-15) performing a re-assignment procedure via the document processing center for re-assigning the issuing form, which expires the examination deadline and is not completely examined, and then performing step (20-2); and (20-16) terminating the examination via the document processing center of the network server together with the service server, according to the examination routing and examiner/parallel examiner for the issuing form.

* * * * *